(12) United States Patent
Tanigaki (10) Patent No.: US 10,711,688 B2
(45) Date of Patent: Jul. 14, 2020

(54) VARIABLE FLOW RATE VALVE MECHANISM AND TURBOCHARGER

(71) Applicant: IHI Corporation, Koto-ku (JP)

(72) Inventor: Michihiko Tanigaki, Koto-ku (JP)

(73) Assignee: IHI Corporation, Koto-ku (JP)

( * ) Notice: Subject to any disclaimer, the term of this patent is extended or adjusted under 35 U.S.C. 154(b) by 109 days.

(21) Appl. No.: 15/766,645

(22) PCT Filed: Oct. 5, 2016

(86) PCT No.: PCT/JP2016/079578
§ 371 (c)(1),
(2) Date: Apr. 6, 2018

(87) PCT Pub. No.: WO2017/061450
PCT Pub. Date: Apr. 13, 2017

(65) Prior Publication Data
US 2018/0298811 A1    Oct. 18, 2018

(30) Foreign Application Priority Data

Oct. 7, 2015   (JP) .................................. 2015-199580

(51) Int. Cl.
*F02B 37/18*    (2006.01)
*F16K 1/20*    (2006.01)
(Continued)

(52) U.S. Cl.
CPC .......... *F02B 37/186* (2013.01); *F01D 17/105* (2013.01); *F04D 27/0215* (2013.01);
(Continued)

(58) Field of Classification Search
CPC .. F05D 2260/57; F16K 1/2035; F16K 1/2071; F16K 31/521
See application file for complete search history.

(56) References Cited

U.S. PATENT DOCUMENTS 9,127,590 B2 *   9/2015   Schoenherr ............ F02B 37/183
9,869,238 B2 *   1/2018   Stilgenbauer ......... F01D 17/105
(Continued)

FOREIGN PATENT DOCUMENTS

CN    101460724 A    6/2009
CN    102052144 A    5/2011
(Continued)

OTHER PUBLICATIONS

International Search Report dated Dec. 27, 2016 in PCT/JP2016/079578, 1 page.

*Primary Examiner* — Igor Kershteyn
*Assistant Examiner* — Jason G Davis
(74) *Attorney, Agent, or Firm* — Oblon, McClelland, Maier & Neustadt, L.L.P.

(57) ABSTRACT

A variable flow rate valve mechanism includes: a valve body which opens and closes an opening; a stem which is rotatably supported by a housing while the valve body is connected to a first end thereof; a cylindrical bearing which is inserted through a through-hole of the housing and supports the stem to be rotatable about an axis line of the stem; a link member which is connected to a second end of the stem; and a spring mechanism which is disposed in a gap between the link member and an end of the bearing, on the side of the second end. An end of the bearing includes an inclined surface which contacts the spring mechanism and is inclined with respect to the axis line of the stem.

5 Claims, 7 Drawing Sheets

(51) Int. Cl.
*F16K 31/52* (2006.01)
*F04D 27/02* (2006.01)
*F01D 17/10* (2006.01)

(52) U.S. Cl.
CPC .......... *F16K 1/2035* (2013.01); *F16K 31/521* (2013.01); *F05D 2220/40* (2013.01); *F05D 2260/57* (2013.01); *Y02T 10/144* (2013.01)

(56) References Cited

U.S. PATENT DOCUMENTS

| | | | |
|---|---|---|---|
| 2004/0182440 A1* | 9/2004 | Watts | ........................ F16K 1/22 137/375 |
| 2010/0218499 A1 | 9/2010 | Shibui et al. | |
| 2011/0182722 A1 | 7/2011 | Matsuyama | |
| 2012/0317975 A1 | 12/2012 | Schoenherr et al. | |
| 2012/0319020 A1 | 12/2012 | Doehler et al. | |
| 2013/0149114 A1 | 6/2013 | Kohler | |
| 2015/0097345 A1 | 4/2015 | House et al. | |
| 2015/0147162 A1 | 5/2015 | Stilgenbauer et al. | |
| 2015/0285133 A1 | 10/2015 | Byon | |
| 2018/0073425 A1 | 3/2018 | Stilgenbauer et al. | |
| 2018/0291801 A1 | 10/2018 | Byon | |

FOREIGN PATENT DOCUMENTS

| | | |
|---|---|---|
| CN | 102828818 A | 12/2012 |
| CN | 104379897 A | 2/2015 |
| CN | 104884760 A | 9/2015 |
| DE | 10 2012 216 893 A1 | 4/2014 |
| JP | 2006-291782 | 10/2006 |
| JP | 2009-47027 | 3/2009 |
| JP | 2012-47090 | 3/2012 |
| JP | 2013-130133 | 7/2013 |
| JP | 2013-541671 | 11/2013 |
| JP | 2013-256897 | 12/2013 |
| JP | 2014-218945 | 11/2014 |
| JP | 2015-522135 | 8/2015 |
| KR | 10-2015-0013684 A | 2/2015 |
| KR | 10-2015-0028821 A | 3/2015 |

* cited by examiner

VARIABLE FLOW RATE VALVE MECHANISM AND TURBOCHARGER

TECHNICAL FIELD

The present disclosure relates to a variable flow rate valve mechanism and a turbocharger.

BACKGROUND ART

Hitherto, a variable flow rate valve mechanism which adjusts a flow rate of a working fluid supplied to a turbine of a turbocharger is known (for example, see Patent Literature 1). The variable flow rate valve mechanism includes a bushing (a bearing) which is provided in a turbine housing accommodating a turbine, a stem which is rotatably supported by the bushing, a valve body which is connected to one end of the stem, and a link member which is connected to a base end of the stem and swings about an axis line of the stein by the driving of an actuator.

CITATION LIST

Patent Literature

Patent Literature 1: Japanese Unexamined Patent Publication No. 2006-291782

SUMMARY OF INVENTION

Technical Problem

In the above-described related art, a spring mechanism is inserted into a gap between the link member and a cover member covering an end surface at the other end side of the bearing. Further, in the related art, a gap between the end surface of the bearing and the link member is widely set. It is effective to widen the gap in order to improve a degree of freedom in design of the spring mechanism depending on the specifications of various engines, but the link member largely protrudes toward the outside of the turbine housing. Meanwhile, an engine size tends to be small in accordance with a strict exhaust gas regulation of the engine and a space for mounting the turbocharger is limited likewise. For this reason, it is desirable to avoid an increase in gap between the end surface of the bearing and the link member more than necessary.

The present disclosure describes a variable flow rate valve mechanism and a turbocharger capable of improving a degree of freedom in design of a spring mechanism disposed in a gap between an end surface of a bearing supporting a stem and a link member while suppressing an increase in gap.

Solution to Problem

An aspect of the present disclosure provides a variable flow rate valve mechanism which opens and closes an opening of a variable gas flow rate passage, the variable flow rate valve mechanism including: a valve body which opens and closes the opening; a stem which is rotatably supported by a housing while the valve body is connected to a first end thereof; a cylindrical bearing which is inserted through a through-hole of the housing and rotatably supports the stem about an axis line of the stem; a link member which is connected to a second end of the stem; and a spring mechanism which is disposed in a gap between the link member and an end of the bearing on the side of the second end, in which the end of the bearing includes an inclined surface which contacts the spring mechanism and is inclined with respect to the axis line of the stem.

Effects of Invention

According to an aspect of the present disclosure, it is possible to improve a degree of freedom in design of a spring mechanism disposed in a gap between an end surface of a bearing and a link member while suppressing an increase in gap.

DESCRIPTION OF EMBODIMENTS

An aspect of the present disclosure provides a variable flow rate valve mechanism which opens and closes an opening of a variable gas flow rate passage, the variable flow rate valve mechanism including: a valve body which opens and closes the opening; a stem which is rotatably supported by a housing while the valve body is connected to a first end thereof; a cylindrical bearing which is inserted through a through-hole of the housing and rotatably supports the stem about an axis line of the stem; a link member which is connected to a second end of the stem; and a spring mechanism which is disposed in a gap between the link member and an end of the bearing on the side of the second end, in which the end of the bearing includes an inclined surface which contacts the spring mechanism and is inclined with respect to the axis line of the stem.

In the variable flow rate valve mechanism, since an end of the bearing on the side of the second end is provided with the inclined surface which is inclined with respect to the axis line of the stem and the spring mechanism is disposed to contact the inclined surface, it is possible to dispose a part of the spring mechanism at the inside in the axial direction of the stem in relation to the end surface of the bearing. Accordingly, it is possible to ensure a gap where the spring mechanism is disposed while suppressing an increase in gap between the link member and the end of the bearing on the side of the second end. Since it is possible to ensure a space in which the spring mechanism is disposed while keeping a positional relation between the bearing and the link member in the axial direction of the stem, it is possible to extend the length of the spring mechanism in the axial direction of the stem and to improve a degree of freedom in design of the spring mechanism.

The inclined surface is inclined to be widened outward in a radial direction of the bearing as it goes from the first end side toward the second end side in an axial direction of the stem at the inside in the radial direction of the bearing. Accordingly, a space for disposing the spring mechanism therein is ensured at the inside in the radial direction. For that reason, the end of the bearing exists at the outside of the spring mechanism in the radial direction and the exposure of the spring mechanism to the outside is suppressed. Since the inclined surface faces the axis center of the bearing, it is possible to align the center of the spring mechanism contacting the inclined surface to the axis center of the bearing.

The spring mechanism may be a dish-shaped spring (a spring member), the dish-shaped spring may include a protrusion portion which protrudes from the second end side toward the first end side in the axial direction of the bearing, the protrusion portion may be provided with an opening through which the stem passes, and a curved surface may be continuously formed in a circumferential direction of the stem to contact the inclined surface. Accordingly, the inclined surface of the end of the bearing and the curved surface of the spring mechanism can easily contact each other linearly to be continuous in the circumferential direction of the stem. For that reason, it is possible to suppress unevenness in contact pressure in the circumferential direction.

The inclined surface may form a line in a cross-section taken along an axis line of the bearing. Accordingly, it is possible to easily process the inclined surface and to form the inclined surface with high accuracy. Accordingly, the contact between the inclined surface and the spring mechanism can be easily realized according to a design.

The spring mechanism may include a flange portion which contacts the link member while protruding outward in the radial direction of the bearing at the second end side in the axial direction of the stem. Accordingly, the posture of the spring mechanism can be stabilized while the flange portion formed on the side of the second end in the spring mechanism is pressed against the link member. Since the posture of the spring mechanism is stabilized, an urging force generated by the spring mechanism can be transmitted to the inclined surface and the link member.

The link member may be provided with an accommodation recessed portion accommodating the flange portion and restraining the outward movement of the flange portion in the radial direction. Accordingly, it is possible to ensure a space for disposing the spring mechanism therein while keeping a positional relation between the bearing and the link member in the axial direction of the stem. Since the movement of the flange portion with respect to the link member is restrained, the spring mechanism and the link member can be moved together.

Another aspect of the present disclosure is a turbocharger with the variable flow rate valve mechanism including: a turbine; and a compressor which rotates by a rotational driving force generated by the turbine, in which the valve body opens and closes an opening of the variable gas flow rate passage bypassing the turbine.

Hereinafter, embodiments of the present disclosure will be described in detail with reference to the drawings. In addition, the same reference numerals will be given to the same or corresponding portions in the drawings and a repetitive description thereof will be omitted.

(Turbocharger)

Figure 1:
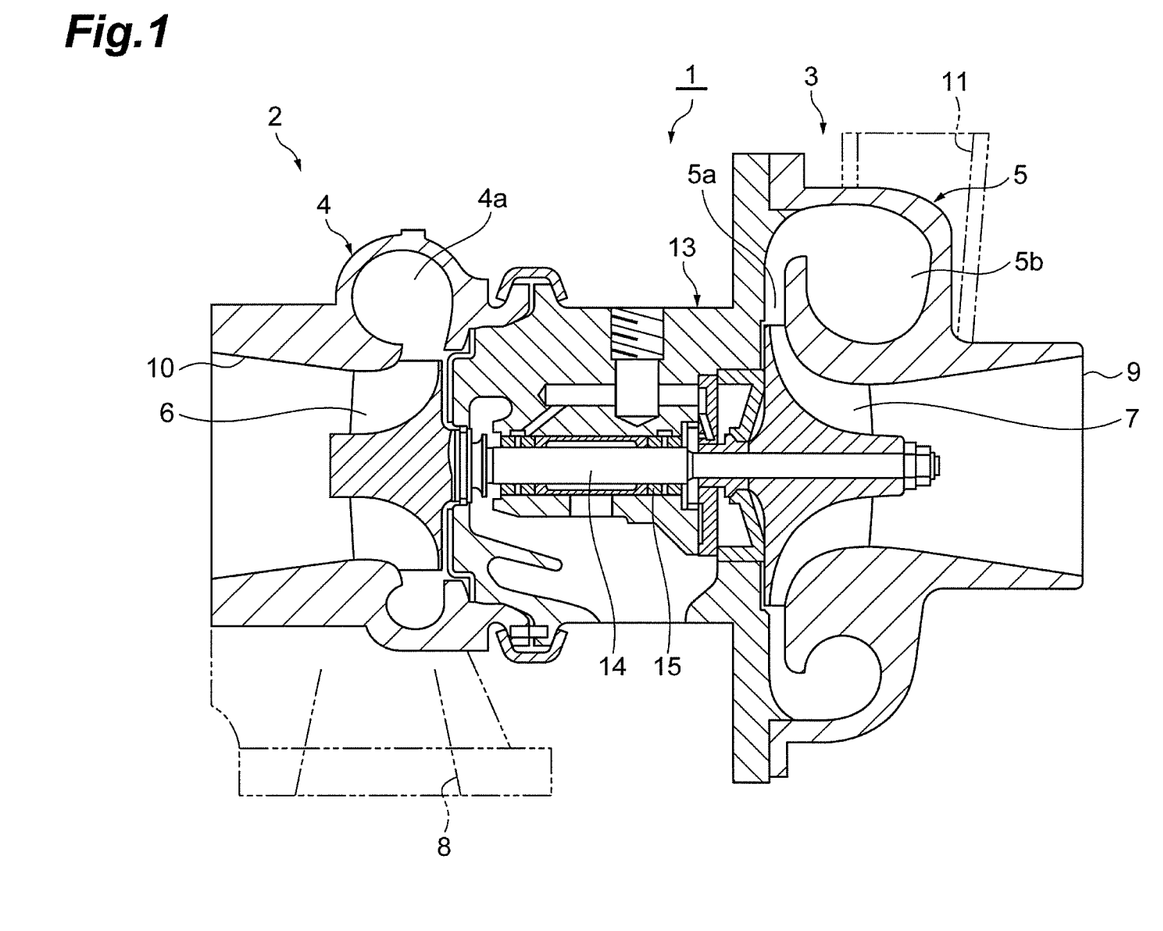
FIG. 1 is a cross-sectional view illustrating a turbocharger according to a first embodiment of the present disclosure.
Figure 2:
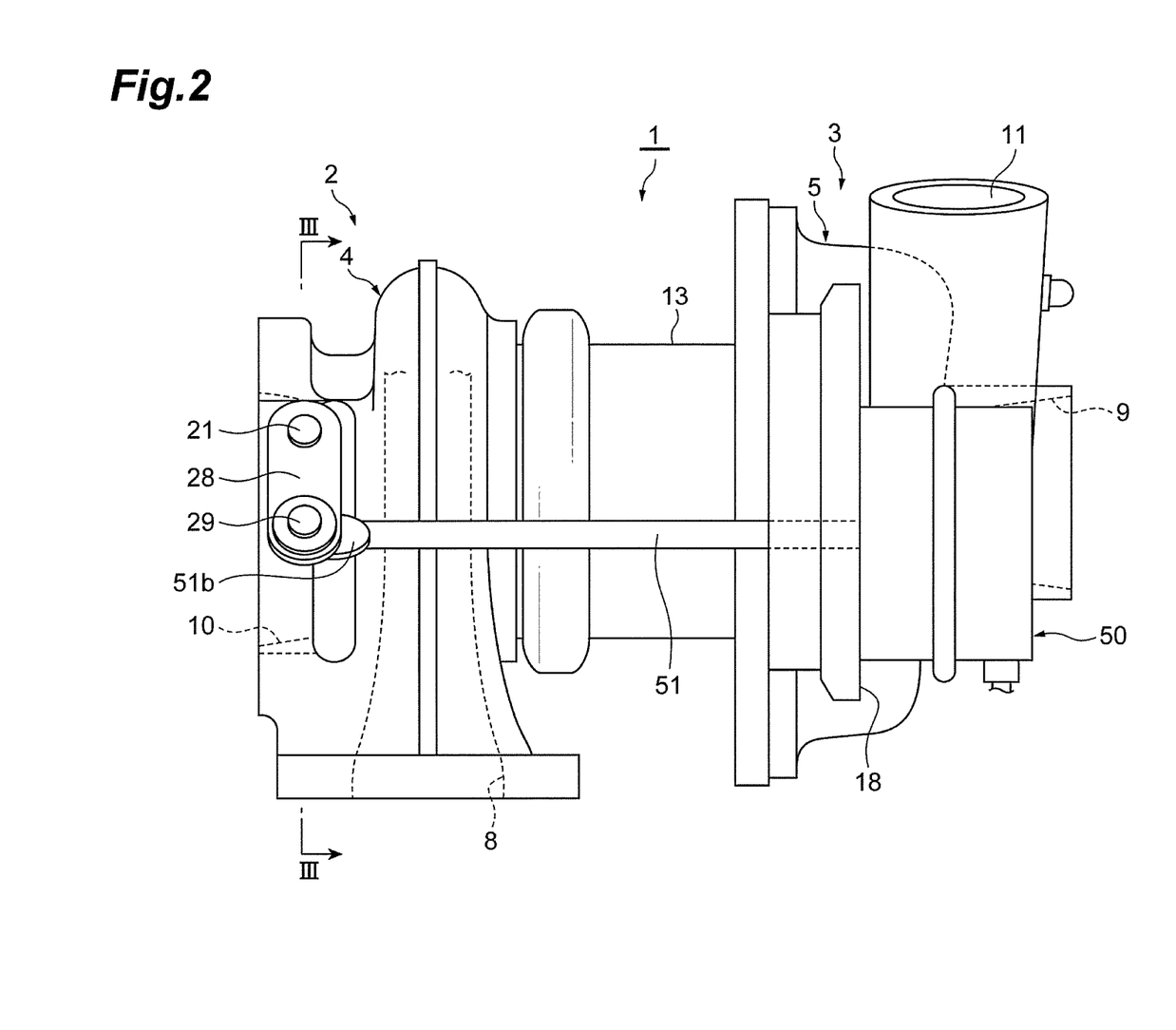
FIG. 2 is a side view illustrating the turbocharger illustrated in FIG. 1.
Figure 3:
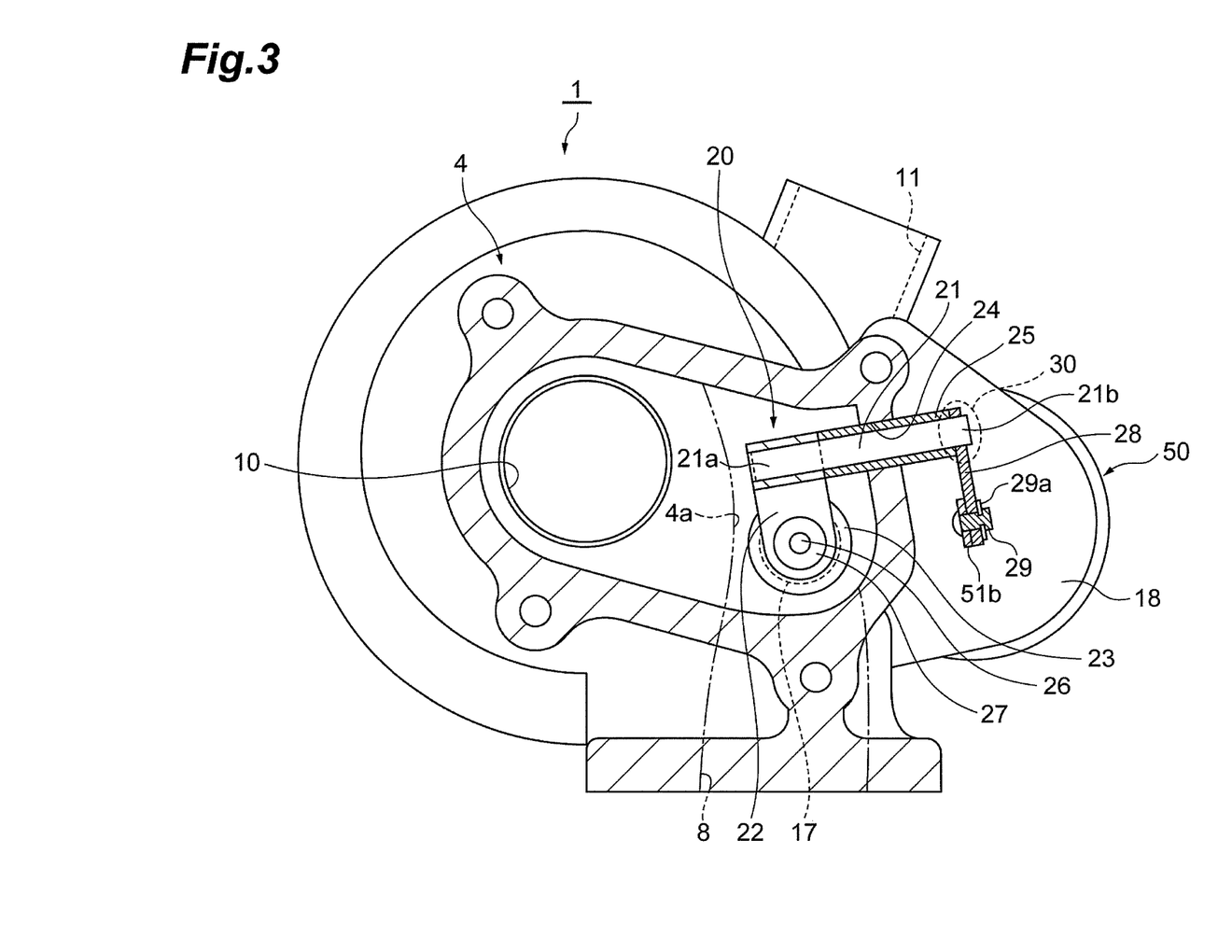
FIG. 3 is a cross-sectional view taken along a line in FIG. 2.

A turbocharger 1 illustrated in FIGS. 1 to 3 is a turbocharger for a vehicle and compresses air supplied to an engine (not illustrated) by using an exhaust gas discharged from the engine. The turbocharger 1 includes a turbine 2 and a compressor (a centrifugal compressor) 3. The turbine 2 includes a turbine housing 4 and a turbine impeller 6 accommodated in the turbine housing 4. The compressor 3 includes a compressor housing 5 and a compressor impeller 7 accommodated in the compressor housing 5.

The turbine impeller 6 is provided at one end of a rotation shaft 14 and the compressor impeller 7 is provided at the other end of the rotation shaft 14. A bearing housing 13 is provided between the turbine housing 4 and the compressor housing 5. The rotation shaft 14 is rotatably supported by the bearing housing 13 through a bearing 15.

The turbine housing 4 is provided with an exhaust gas inlet 8 and an exhaust gas outlet 10. An exhaust gas discharged from the engine flows into the turbine housing 4 through the exhaust gas inlet 8 to rotate the turbine impeller 6 and flows out of the turbine housing 4 through the exhaust gas outlet 10.

The compressor housing 5 is provided with a suction port 9 and a discharge port 11. When the turbine impeller 6 rotates as described above, the rotation shaft 14 and the compressor impeller 7 rotate. The rotating compressor impeller 7 sucks external air through the suction port 9, compresses the air, and discharges the air from the discharge port 11. The compressed air discharged from the discharge port 11 is supplied to the engine.

As illustrated in FIGS. 1 and 3, a bypass passage (see FIG. 3) 17 which derives a part of the exhaust gas introduced from the exhaust gas inlet 8 toward the exhaust gas outlet 10 while bypassing the turbine impeller 6 is formed inside the turbine housing 4. The bypass passage 17 is a variable gas flow rate passage which changes a flow rate of the exhaust gas supplied to the turbine impeller 6.

(Waste Gate Valve)

A waste gate valve 20 which is one of the variable flow rate valve mechanisms is provided inside the turbine housing 4. The waste gate valve 20 is a valve which opens and closes the opening of the bypass passage 17. The waste gate valve 20 includes a stem 21 which is rotatably supported by the outer wall of the turbine housing 4, a swing piece 22 which protrudes in the radial direction of the stem 21 from the stem 21, and a valve body 23 which is supported by the swing piece 22.

The outer wall of the turbine housing 4 is provided with a support hole (a through-hole) 24 which penetrates the outer wall in the plate thickness direction. A cylindrical bushing (a bearing) 25 is inserted through the support hole 24. The bushing 25 is fixed to the outer wall of the turbine housing 4 by press-inserting.

The stem 21 is inserted into the bushing 25 and is supported by the outer wall of the turbine housing 4 to be rotatable. The stem 21 includes one end (a first end) 21a which is disposed inside the turbine housing 4 and the other end (a second end) 21b disposed outside the turbine housing 4. The valve body 23 is connected to one end 21a of the stem 21 through the swing piece 22. The swing piece 22 is fixed to a front end (one end 21a) of the stem 21. The stem 21 rotates about an axis line L1 (see FIG. 4) of the stem 21 to swing the swing piece 22. A front end of the swing piece 22 is provided with an attachment hole for attaching the valve body 23 thereto. For example, a side portion of the swing piece 22 contacts an end surface at one end side of the bushing 25. In addition, one end side and the other end side of the bushing 25 correspond to one end 21a and the other end 21b of the stem 21.

The valve body 23 is able to contact and separate from the peripheral edge of the opening of the bypass passage 17 and is formed in, for example, a disk shape. The valve body 23 is provided with a valve shaft 26 which protrudes toward the opposite side to the opening of the bypass passage 17. The valve shaft 26 is inserted through an attachment hole of the front end of the swing piece 22. A stopper 27 is fixed to an end opposite to the valve body 23 in the valve shaft 26 and the valve shaft 26 inserted through the attachment hole is held by the stopper 27. The valve body 23 is supported by the swing piece 22 to be slightly movable. In the specification, the "slight movement" includes the meaning of "inclination". Accordingly, since the valve body 23 slightly moves with respect to the swing piece 22, the valve body 23 closely contacts the peripheral edge (the valve seat) of the opening of the bypass passage 17. Then, the valve body 23 contacts the peripheral edge of the opening of the bypass passage 17 so that the waste gate valve 20 is closed and the valve body 23 is separated from the peripheral edge of the opening of the bypass passage 17 so that the waste gate valve 20 is opened.

A plate-shaped link member 28 that protrudes in the radial direction of the stem 21 is fixed to a base end (an end on the side of the other end 21b) disposed outside the turbine housing 4 of the stem 21. A front end of the link member 28 is provided with an attachment hole through which a connection pin 29 is inserted and the connection pin 29 is inserted through the attachment hole. An operation rod 51 of an actuator 50 is connected through the connection pin 29. The connection pin 29 is inserted through an attachment hole formed at a front end 51b of the operation rod 51.

One end of the connection pin 29 is fixed to the operation rod 51 by caulking. A clip 29a is attached to the other end of the connection pin 29 to prevent the separation of the connection pin 29 from the attachment hole. The stem 21 is connected to the operation rod 51 of the actuator 50 through the link member 28 and the connection pin 29.

The actuator 50 is, for example, a diaphragm type actuator. The actuator 50 swings the link member 28 by moving the operation rod 51 in the axial direction of the operation rod 51 in a reciprocating manner so that the stem 21 rotates about the axis line of the stem 21.

(Bushing End Structure)

Figure 4:
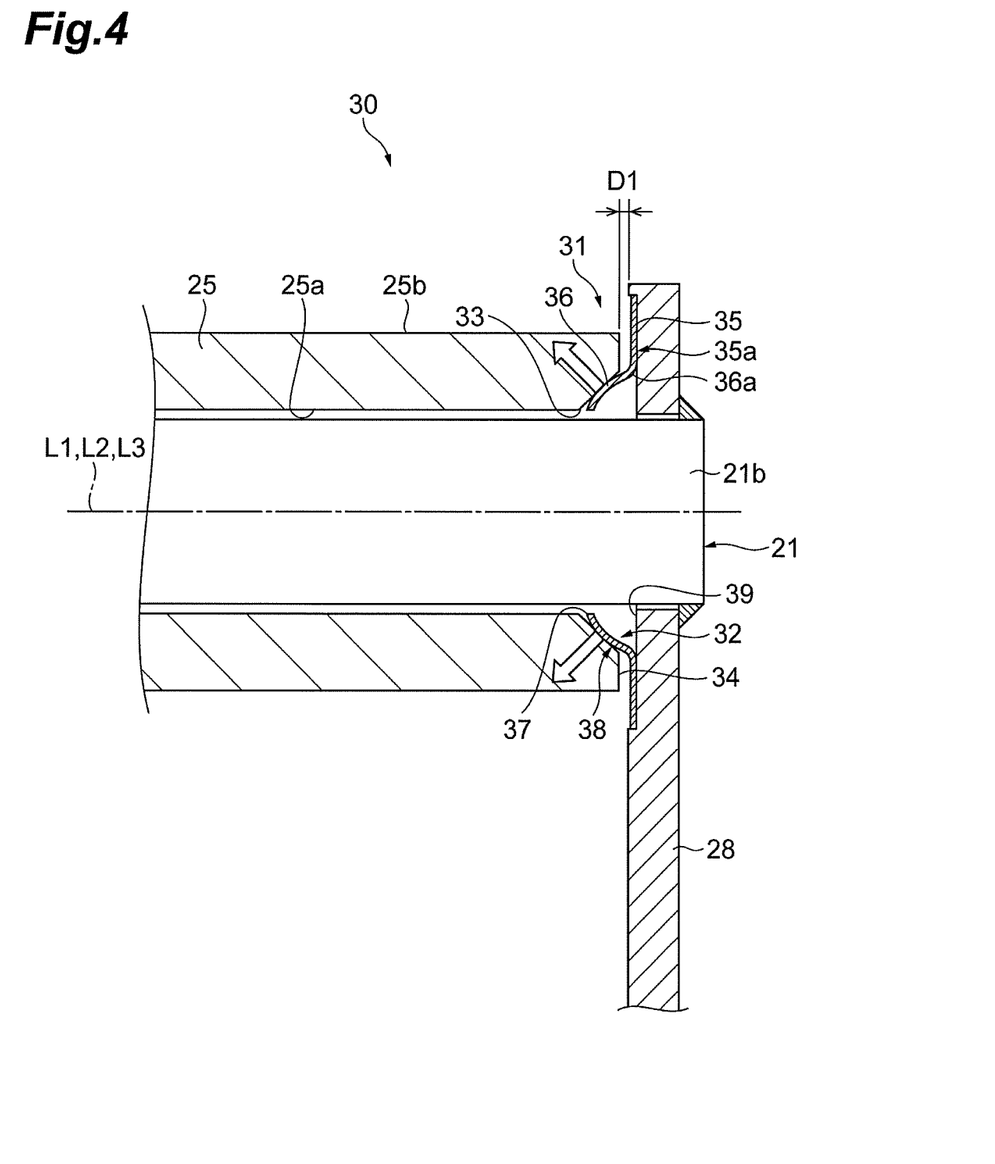
FIG. 4 is a cross-sectional view illustrating an end at the other end side of a bushing in a waste gate valve according to the first embodiment of the present disclosure.

Next, an end structure 30 of the bushing 25 will be described with reference to FIG. 4. In the direction of the axis line L1 of the stem 21, a spring mechanism 32 is disposed between the other end (an end on the side of the other end 21b) 31 of the bushing 25 and the link member 28. Further, in FIG. 3, the spring mechanism 32 and an inclined surface 33 to be described later are not illustrated in the drawings.

The other end 31 is provided with the inclined surface 33 which is inclined with respect to the axis line L1 of the stem 21. The inclined surface 33 is disposed at the inside of the bushing 25 in the radial direction (at the side of the inner peripheral surface 25a). The inclined surface 33 is inclined to be widened outward in the radial direction as it goes from one end side toward the other end side in the extension direction of the axis line L2 of the bushing 25. The inclined surface 33 is continuously formed in the entire circumference in the circumferential direction of the bushing 25. In addition, the axis line L1 of the stem 21 is disposed coaxially with the axis line L2 of the bushing 25. Here, the coaxial state mentioned herein may not be precisely set. For example, the axis line L1 of the stem 21 may be slightly deviated or inclined with respect to the axis line L2 of the bushing 25 within a range in which the effect of the present disclosure can be exhibited.

The inclined surface 33 is formed in a linear shape in a cross-section taken along the axis line L2 of the bushing 25. An inner peripheral end of the inclined surface 33 is located at the inner peripheral surface 25a of the bushing 25. For example, an outer peripheral end of the inclined surface 33 is located at substantially the center of the bushing 25 in the thickness direction. A flat surface 34 which is orthogonal to the axis line L2 is formed at the outside of the inclined surface 33 in the radial direction of the bushing 25. The flat surface 34 extends from the outer peripheral end of the inclined surface 33 to an outer peripheral surface 25b of the bushing 25 in the radial direction of the bushing 25. The flat surface 34 is located at a position closest to the other end (on the side of the link member 28) in a direction along the axis line L2 of the bushing 25.

The spring mechanism 32 is a dish-shaped spring (a spring member) and includes a flange portion 35 disposed at the outer peripheral side and a protrusion piece (a protrusion portion) 36 disposed at the inner peripheral side. An opening 37 through which the stem 21 is inserted is formed at the center of the spring mechanism 32 (the center of the protrusion piece 36). The spring mechanism 32 is formed by processing, for example, a disk-shaped (plate-shaped) stainless steel by pressing. In addition, the material of the spring mechanism 32 is not limited to the stainless steel and may be, for example, other materials such as carbon steel and spring steel.

The protrusion piece 36 is formed in a ring shape when viewed from the extension direction of the axis line L3 corresponding to the center line of the opening 37 and protrudes from the other end toward one end in a direction along the axis line L3. In addition, one end and the other end of the protrusion piece 36 (the spring mechanism 32) correspond to one end 21a and the other end 21b of the stem 21.

The protrusion piece 36 includes a curved surface 38 which is formed at the peripheral edge of the opening 37. The curved surface 38 is continuous in the entire circumference in the circumferential direction of the opening 37. In a cross-section taken along the axis line L3, a tangential line of the curved surface 38 is gradually inclined, for example, from a state where the tangential line is orthogonal to the axis line L3 to a state where the tangential line is parallel to the axis line L3 as it goes from the inside toward the outside in the radial direction. The curved surface 38 is a contact surface contacting the inclined surface 33 of the bushing 25. In addition, the curved surface 38 may correspond to the inclined surface 33 of the bushing 25 and the tangential line of the end at the inside in the radial direction is not limited to the state of being orthogonal to the axis line L3 and may be inclined with respect to, for example, the axis line L3. Similarly, the tangential line of the end at the outside in the radial direction is not limited to the state of being parallel to the axis line L3 and may be inclined with respect to, for example, the axis line L3.

The flange portion 35 protrudes outward in the radial direction from an end 36a at the outside in the radial direction of the protrusion piece 36. The flange portion 35 is continuously formed in the entire circumference in the circumferential direction. A surface at the other end side of the flange portion 35 is a surface orthogonal to the axis line L3 and is a surface contacting the link member 28. The outer diameter of the flange portion 35 is larger than, for example, the outer diameter of the bushing 25.

A recessed portion (an accommodation recessed portion) 39 to which the spring mechanism 32 is fitted is formed in a surface facing the other end 31 of the bushing 25 in the link member 28. Specifically, the flange portion 35 of the spring mechanism 32 is accommodated in the recessed portion 39. The recessed portion 39 is formed in a circular shape when viewed from a direction along the axis line L1. A bottom surface (a surface orthogonal to the axis line L1) of the recessed portion 39 contacts the other end side surface 35a of the flange portion 35. A side wall surface of the recessed portion 39 is a surface facing the outer peripheral surface of the flange portion 35 in the radial direction of the stem 21. The inner diameter (a distance between facing side wall surfaces) of the recessed portion 39 is slightly larger than the outer diameter of the flange portion 35.

Next, the operation and effect of the turbocharger 1 will be described.

An exhaust gas which flows from the exhaust gas inlet 8 passes through a turbine scroll flow path 4a and is supplied to the inlet of the turbine impeller 6. The turbine impeller 6 generates a rotational force by using a pressure of the exhaust gas supplied thereto and rotates the rotation shaft 14 and the compressor impeller 7 along with the turbine impeller 6. Accordingly, air sucked from the suction port 9 of the compressor 3 is compressed by using the compressor impeller 7. The air compressed by the compressor impeller 7 passes through a diffuser flow path 5a and a compressor scroll flow path 5b and is discharged from the discharge port 11. The air discharged from the discharge port 11 is supplied to the engine.

When a supercharging pressure (a pressure of the air discharged from the discharge port 11) reaches a set pressure during the operation of the turbocharger 1, the actuator 50 is driven so that the operation rod 51 is pressed out. A pressing force (a driving force) generated by the operation rod 51 is transmitted to the valve body 23 through the link member 28, the stem 21, and the swing piece 22 connected to the operation rod 51. Accordingly, the valve body 23 moves away from the peripheral edge of the opening of the bypass passage 17 and the waste gate valve 20 is opened. At this time, a part of the exhaust gas flowing from the exhaust gas inlet 8 passes through the bypass passage 17 and bypasses the turbine impeller 6. For that reason, it is possible to decrease a flow rate of the exhaust gas supplied to the turbine impeller 6.

Meanwhile, when the supercharging pressure becomes lower than the set pressure during the operation of the turbocharger 1, a pressing force generated by the operation rod 51 is cancelled and the operation rod 51 is pressed back. Accordingly, the link member 28 swings about the stem 21, the stem 21 rotates about the axis line L1, and the swing piece 22 swings. Then, the valve body 23 moves toward the peripheral edge of the opening of the bypass passage 17 to be pressed against the peripheral edge of the opening and the waste gate valve 20 is closed. That is, the bypassing of the exhaust gas using the bypass passage 17 is not performed in the turbine 2.

In the waste gate valve 20 of the turbocharger 1, the spring mechanism 32 is attached into a gap between the link member 28 and the other end 31 of the bushing 25 in the direction along the axis line L1 of the stem 21 and the inclined surface 33 of the bushing 25 contacts the curved surface 38 of the spring mechanism 32. Accordingly, an urging force is generated by the spring mechanism 32 in both directions including the direction along the axis line L2 of the bushing 25 and the radial direction of the bushing 25 (a direction orthogonal to the axis line L2).

Then, the spring mechanism 32 urges the link member 28 outward in a direction along the axis line L2 of the bushing 25. Accordingly, the stem 21 is urged outward in a direction along the axis line L2 of the bushing 25 and the movement of the stem 21 in the direction of the axis line L1 is suppressed.

The spring mechanism 32 is aligned so that the axis line L2 of the bushing 25 overlaps the axis line L3 of the spring mechanism 32 in the radial direction of the bushing 25. That is, the spring mechanism 32 is aligned while being moved so that forces are balanced in the circumferential direction by the protrusion piece 36 of the spring mechanism 32. Accordingly, the link member 28 is moved and aligned so that the axis line L1 of the stem 21 matches the axis line L2 of the bushing 25. As a result, the movement of the stem 21 in the radial direction is suppressed.

In this way, since the movement of the stem 21 in the direction of the axis line L1 is suppressed and the movement of the stem 21 in the radial direction is suppressed in the waste gate valve 20, the vibration of the stem 21 can be suppressed. That is, since the movement of the stem 21 is suppressed, the vibration and the positional deviation of the valve body 23 connected to the stem 21 are suppressed. As a result, the generation of abnormal sound in the waste gate valve 20 is suppressed.

In the waste gate valve 20, the inclined surface 33 is forming at the other end 31 of the bushing 25 and a space for disposing the spring mechanism 32 is ensured at the inside in the direction of the axis line L2 of the bushing 25 in relation to the flat surface 34. Accordingly, a part of the spring mechanism 32 can be disposed at the inside (one end side) in the direction of the axis line L1 of the stem 21 in relation to the flat surface 34 of the bushing 25. For that reason, it is possible to ensure a space for disposing the spring mechanism 32 without widening a distance D1 between the flat surface 34 of the bushing 25 and the link member 28. As a result, since it is possible to extend the length of the spring mechanism 32 in the direction of the axis line L1 of the stem 21 compared to the related art while keeping a positional relation between the bushing 25 and the link member 28, it is possible to improve a degree of freedom in design of the spring mechanism 32 in the direction of the axis line L1 of the stem 21. That is, it is possible to widen a range of selecting the spring constant of the spring mechanism 32. Accordingly, since the looseness of the spring mechanism 32 is suppressed when the spring constant of the spring mechanism 32 is set to an appropriate value, it is possible to suppress the generation of the vibration of the waste gate valve 20 while increasing the lifetime of the spring mechanism 32.

In the waste gate valve 20, the protrusion piece 36 of the spring mechanism 32 is disposed on the side of the inner peripheral surface 25a of the bushing 25, and an end portion of the bushing 25 exists at the outside of the protrusion piece 36 of the spring mechanism 32 in the radial direction so that the exposure of the spring mechanism 32 to the outside is suppressed.

Since the spring mechanism 32 is provided with the flange portion 35 contacting the link member 28, it is possible to increase a contact area between the spring mechanism 32 and the link member 28 and to stabilize the posture of the spring mechanism 32 with respect to the link member 28. Accordingly, it is possible to reliably transmit a force between the spring mechanism 32 and the link member 28.

Since the link member 28 is provided with the recessed portion 39 and the flange portion 35 of the spring mechanism 32 can be accommodated in the recessed portion 39, it is possible to increase the arrangement space of the spring mechanism 32 in the axis line L1 of the stem 21 and to further improve a degree of freedom in design of the spring mechanism 32. Since it is possible to restrain the movement of the flange portion 35 with respect to the link member 28 in the radial direction of the flange portion 35, it is possible to move the spring mechanism 32 and the link member 28 together.

The inclined surface 33 is inclined to form a line in a cross-section taken along the axis line L2 of the bushing 25. Accordingly, since it is possible to easily process the inclined surface 33, it is possible to form the inclined surface 33 with high accuracy. Accordingly, it is possible to easily realize a contact between the inclined surface 33 and the spring mechanism 32 according to a design.

Second Embodiment

Figure 5:
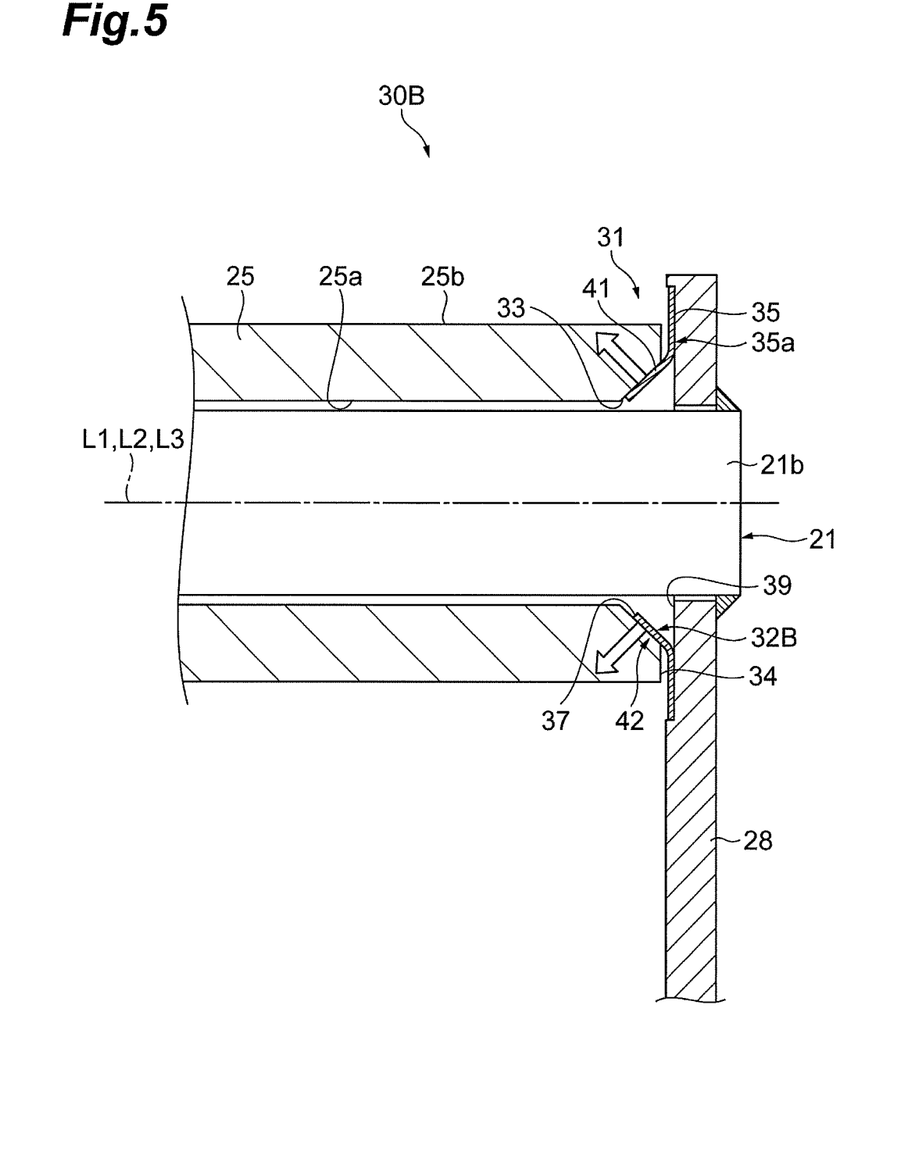
FIG. 5 is a cross-sectional view illustrating an end at the other end side of a bushing in a waste gate valve according to a second embodiment of the present disclosure.

Next, a waste gate valve 20 according to a second embodiment will be described. The waste gate valve 20 according to the second embodiment is different from the waste gate valve 20 of the first embodiment in that an end structure 30B of a bushing 25 is formed such that a spring mechanism 32B with a protrusion piece 41 having a different shape is provided instead of the spring mechanism 32 as illustrated in FIG. 5. Additionally, in the description of the second embodiment, the same description as the first embodiment will be omitted.

The spring mechanism 32B is a dish-shaped spring and includes a flange portion 35 disposed at the outer peripheral side and the protrusion piece 41 disposed at the inner peripheral side. An opening 37 through which a stem 21 is inserted is formed at the center of the spring mechanism 32B (the center of the protrusion piece 41). The spring mechanism 32B is formed by processing, for example, a disk-shaped (plate-shaped) member by pressing. The protrusion piece 41 protrudes from the other end side toward one end side in a direction along an axis line L3.

The protrusion piece 41 includes an inclined surface 42 which is formed at the peripheral edge of the opening 37. The inclined surface 42 is continuously formed in the entire circumference in the circumferential direction of the opening 37. In a cross-section taken along the axis line L3, the inclined surface 42 is formed in a linear shape. The inclined surface 42 is a contact surface which contacts an inclined surface 33 of the bushing 25 and an inclination angle of the inclined surface 42 with respect to the axis line L3 corresponds to an inclination angle of the inclined surface 33 of the bushing 25 with respect to an axis line L2.

Also in the waste gate valve 20 of the second embodiment, the same operation and effect as those of the waste gate valve 20 of the first embodiment are obtained. In addition, the inclination angle of the inclined surface 42 may not be the same as the inclination angle of the inclined surface 33 of the bushing 25. The inclined surface 42 may be formed to be able to contact the inclined surface 33 of the bushing 25.

Third Embodiment

Figure 6:
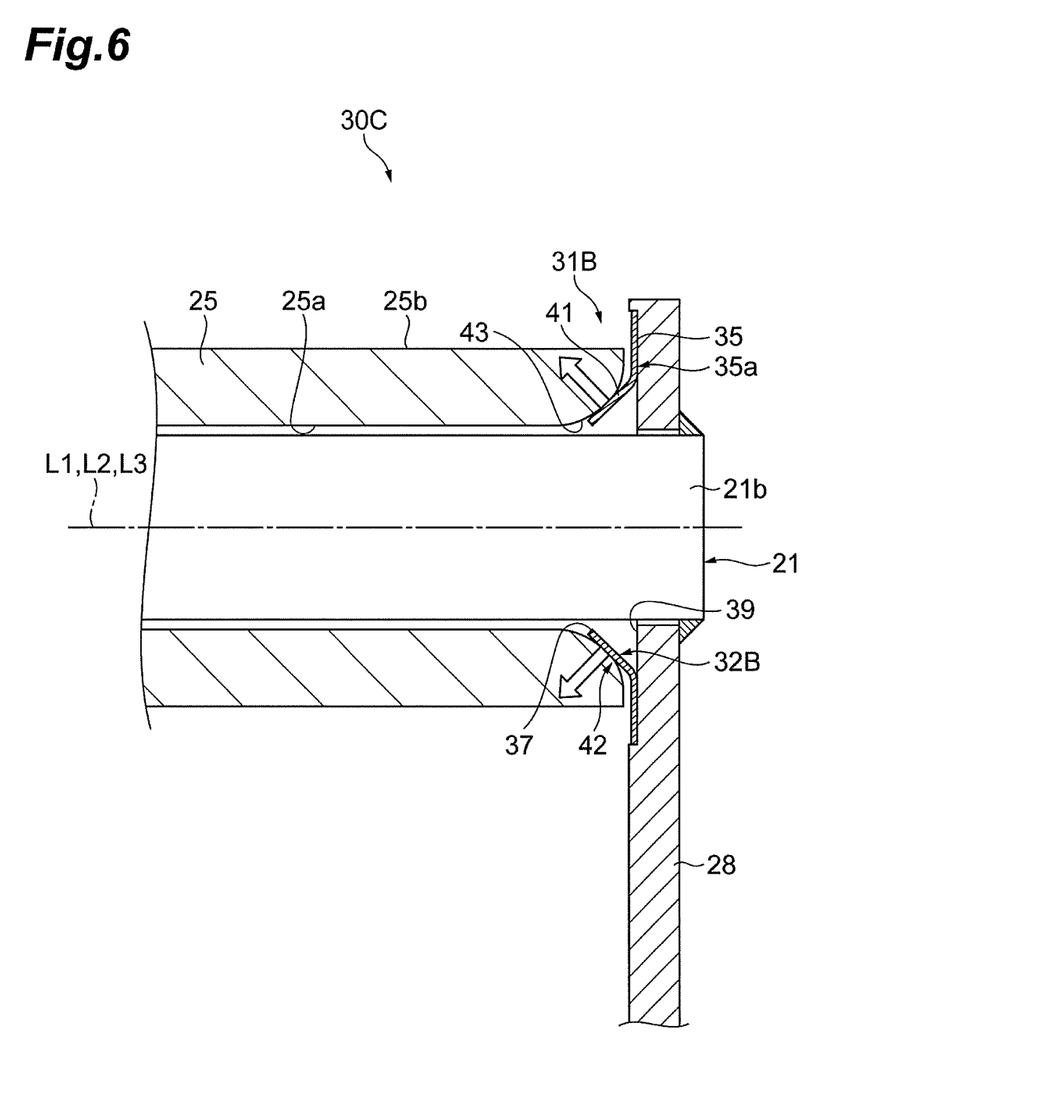
FIG. 6 is a cross-sectional view illustrating an end at the other end side of a bushing in a waste gate valve according to a third embodiment of the present disclosure.

Next, a waste gate valve 20 according to a third embodiment will be described. The waste gate valve 20 according to the third embodiment is different from the waste gate valve 20 of the second embodiment in that an end structure 30C of a bushing 25 is formed such that the other end 31B of the bushing 25 has a different shape as illustrated in FIG. 6. Additionally, in the description of the third embodiment, the same description as that of the first and second embodiments will be omitted.

The other end 31B is provided with a curved surface 43. The curved surface 43 is inclined with respect to an axis line L1 of a stem 21. The curved surface 43 is formed on the side of an inner peripheral surface 25a of the bushing 25. The curved surface 43 is curved to be widened outward in the radial direction as it goes from one end side toward the other end side in the extension direction of an axis line L2 of the bushing 25. In a cross-section taken along the axis line L2, a tangential line of the curved surface 43 is gradually inclined, for example, from a state where the tangential line is parallel to the axis line L2 to a state where the tangential line is orthogonal to the axis line L2 as it goes from the inside toward the outside in the radial direction. An outer peripheral end of the curved surface 43 is disposed at a position intersecting an outer peripheral surface 25b of the bushing 25. In addition, in a cross-section taken along the axis line L2, a curvature of the curved surface 43 may be the same curvature in the curved surface or a different curvature in the curved surface. A spring mechanism contacting the curved surface 43 is not limited to the spring mechanism 32B illustrated in FIG. 5 and may be, for example, the spring mechanism 32 having the curved surface 38 as illustrated in FIG. 4 or spring mechanisms having other shapes.

Fourth Embodiment

Figure 7:
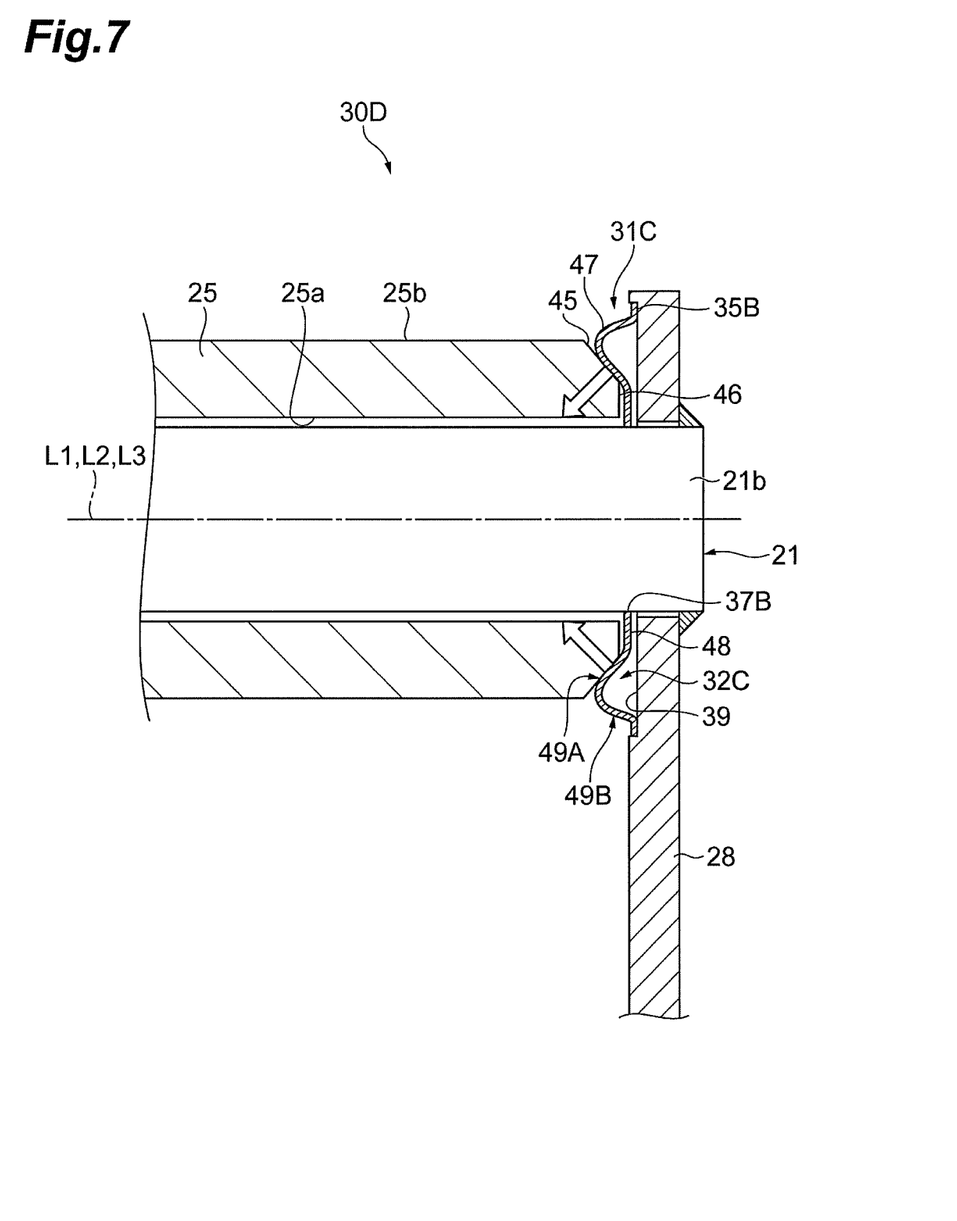
FIG. 7 is a cross-sectional view illustrating an end at the other end side of a bushing in a waste gate valve according to a fourth embodiment of the present disclosure.

Next, a waste gate valve according to a fourth embodiment will be described. The waste gate valve 20 according to the fourth embodiment is different from the waste gate valve 20 of the first embodiment in that an end structure 30D of a bushing 25 is formed such that the other end 31C of a bushing 25 has a different shape and a spring mechanism 32C having a different shape is provided instead of the spring mechanism 32 as illustrated in FIG. 7. Additionally, in the description of the fourth embodiment, the same description as those of the first to third embodiments will be omitted.

The other end 31C is provided with an inclined surface 45 which is inclined with respect to an axis line L1 of a stem 21. The inclined surface 45 is disposed at the outside in the radial direction of the bushing 25 (on the side of an outer peripheral surface 25b). The inclined surface 45 is inclined inward in the radial direction as it goes from one end side toward the other end side in the extension direction of an axis line L2 of the bushing 25. The inclined surface 45 is continuously formed in the entire circumference in the circumferential direction of the bushing 25.

The inclined surface 45 is formed in a linear shape in a cross-section taken along the axis line L2 of the bushing 25. An outer peripheral end of the inclined surface 45 is located at the outer peripheral surface 25b of the bushing 25. An inner peripheral end of the inclined surface 45 is located at, for example, substantially the center of the bushing 25 in the plate thickness direction. A flat surface 46 which is orthogonal to the axis line L2 is formed at the inner peripheral surface 25a in relation to the inclined surface 45 in the radial direction of the bushing 25. The flat surface 46 is formed from a position intersecting the inner peripheral surface 25a of the bushing 25 to the inner peripheral end of the inclined surface 45 in the radial direction of the bushing 25. The flat surface 46 is located at a position closest to the other end (on the side of the link member 28) in a direction along the axis line L2 of the bushing 25.

The spring mechanism 32C is formed in a ring shape and includes a flange portion 35B disposed at the outer peripheral side, a protrusion portion 47 disposed at the inner peripheral side, and an inner peripheral ring portion 48 provided at the inner peripheral side of the protrusion portion 47. An opening 37B through which the stem 21 is inserted is formed at the center of the spring mechanism 32C. The spring mechanism 32C is formed by processing, for example, a disk-shaped (plate-shaped) member by pressing. A peripheral edge of the opening 37B contacts, for example, the outer peripheral surface of the stem 21. With such a configuration, it is possible to suppress an inclination of the posture of the spring mechanism 32C at the time of assembling the spring mechanism 32C and to easily fit the protrusion portion 47 of the spring mechanism 32C to the inclined surface 45 of the bushing 25. Further, in this case, a gap between the inner diameter of the recessed portion 39 and the outer diameter of the flange portion 35B may be widened compared to a case where the peripheral edge of the opening 37B does not contact the outer peripheral surface of the stem 21 so that the inner and outer peripheral ends of the spring mechanism 32C are not simultaneously restrained, for example, at the time of operating the engine. Accordingly, it is possible to prevent an excessive load from being applied to the spring mechanism 32C.

The inner peripheral ring portion 48 forms a flat surface which is orthogonal to the axis line L3. For example, the inner peripheral ring portion 48 is disposed at one end side in relation to the flange portion 35B in the direction of the axis line L3. The outer peripheral end of the inner peripheral ring portion 48 is the inner peripheral end of the protrusion portion 47.

The protrusion portion 47 is formed to protrude one end (one end 21a of the stem 21) from the inner peripheral ring portion 48 in the direction along the axis line L3. The protrusion portion 47 includes an inclined surface 49A which is disposed at the inner peripheral side and faces the axis line L3 and an inclined surface 49B which is disposed at the outer peripheral side and faces the opposite side to the axis line L3 in a cross-section taken along the axis line L3.

The inclined surface 49A is disposed from the other end side toward one end side as it goes from the inner peripheral side toward the outer peripheral side. The inclined surface 49A is a contact surface which contacts the inclined surface 45 of the bushing 25 and an inclination angle of the inclined surface 49A with respect to the axis line L3 corresponds to an inclination angle of the inclined surface 45 of the bushing 25 with respect to the axis line L2.

The inclined surface 49B is formed to be bent from the outer peripheral end of the inclined surface 49A toward the other end side (the other end side of the stem 21) and is disposed from one end side toward the other end side as it goes from the inner peripheral side toward the outer peripheral side. The outer peripheral end of the inclined surface 49A is the inner peripheral end of the flange portion 35B.

In the waste gate valve 20 of the fourth embodiment, the inclined surface 45 of the bushing 25 contacts the inclined surface 49A of the spring mechanism 32C so that an urging force is generated by the spring mechanism 32C in both directions including the direction along the axis line L2 of the bushing 25 and the radial direction of the bushing 25. Accordingly, the movement of the stem 21 in the direction of the axis line L1 and the radial direction of the stem 21 is suppressed.

In the waste gate valve 20 of the fourth embodiment, the inclined surface 45 is formed at the other end 31C of the bushing 25 and a space capable of disposing the spring mechanism 32C is ensured at the inside in the direction of the axis line L2 of the bushing 25 in relation to the flat surface 46. Accordingly, a part of the spring mechanism 32C can be disposed at the inside (one end side) in the direction of the axis line L1 of the stem 21 in relation to the flat surface 46 of the bushing 25. For that reason, it is possible to ensure a space in which the spring mechanism 32C is disposed without increasing a distance between the flat surface 46 of the bushing 25 and the link member 28. As a result, since it is possible to extend the length of the spring mechanism 32C in the direction of the axis line L1 of the stem 21 compared to the related art while keeping a positional relation between the bushing 25 and the link member 28 in the direction of the axis line L1 of the stem 21, it is possible to improve a degree of freedom in design of the spring mechanism 32C. That is, it is possible to widen the spring constant selection range of the spring mechanism 32C. Accordingly, since the looseness of the spring mechanism 32C is suppressed when the spring constant of the spring mechanism 32C is set to an appropriate value, it is possible to suppress the generation of the vibration of the waste gate valve 20 while increasing the lifetime of the spring mechanism 32C.

The present disclosure is not limited to the above-described embodiments and can be modified into various forms as below without departing from the spirit of the present disclosure.

In the above-described embodiment, the spring mechanism 32 is formed as a dish-shaped spring, but the spring mechanism is not limited to the dish-shaped member. For example, the spring mechanism may include a compression coil spring, a volute spring, or the like, may include a cylindrical portion, or may have other shapes. The spring mechanism 32 may be used so that a plurality of spring mechanisms overlap each other. The spring mechanism may include a ring-shaped elastic member.

In the above-described embodiment, the spring mechanism 32 includes the flange portion 35, but the spring mechanism may not include the flange portion. The flange portion may be provided to protrude inward in the radial direction.

In the above-described embodiment, the recessed portion 39 accommodating the flange portion 35 is provided in the link member 28, but the link member 28 may not be provided with the recessed portion 39. In the link member 28, a protrusion structure for restraining the movement of the spring mechanism 32 in the radial direction may be provided instead of the recessed portion 39.

In the above-described embodiment, the inclined surface 33 which is continuously formed in the entire circumference in the circumferential direction of the bushing 25 has been described, but the inclined surface may be partially formed in the circumferential direction. It is preferable that the spring mechanism 32 contact the entire circumference in the inclined surface 33 of the bushing 25, but the spring mechanism may partially contact the inclined surface. When the inclined surface 33 of the bushing 25 and the spring mechanism 32 contact each other in the entire circumference, the leakage of the gas entering the gap between the inner peripheral surface 25a of the bushing 25 and the outer peripheral surface of the stem 21 is prevented.

In the fourth embodiment, a configuration in which the peripheral edge of the opening 37B of the spring mechanism 32C contacts, for example, the outer peripheral surface of the stem 21 has been described, but the peripheral edge may not contact the outer peripheral surface of the stem 21. In this case, a gap of the opening 37B between the stem 21 and the peripheral edge of the opening 37B may not be the same as a gap between the inner diameter of the recessed portion 39 and the outer diameter of the flange portion 35B so that the inner and outer peripheral ends of the spring mechanism 32C are not simultaneously restrained, for example, at the time of operating the engine. A gap between the recessed portion 39 and the flange portion 35B in the radial direction may be wider or narrower than a gap between the opening 37B and the stem 21 in the radial direction in response to an engine operation condition. A configuration in which the peripheral edge of the opening 37B of the spring mechanism 32C contacts the outer peripheral surface of the stem 21 may be applied to the first to third embodiments. For example, when an inner peripheral ring which is orthogonal to the axis line L3 is provided at the inner peripheral side of the spring mechanism 32 continuous to the contact surface with the bushing 25, the peripheral edge of the opening 37 can contact the outer peripheral surface of the stem 21.

In the above-described embodiment, an example has been described in which the turbocharger 1 employing the waste gate valve 20 is applied to a vehicle, but the application of the turbocharger is not limited to the vehicle. For example, the turbocharger may be applied to a marine engine and other engines.

INDUSTRIAL APPLICABILITY

According to any aspect of the present disclosure, it is possible to improve a degree of freedom in design of a spring mechanism disposed in a gap between an end surface of a bearing and a link member while suppressing an increase in gap.

Reference Signs List

| | |
|---|---|
| 1 | turbocharger |
| 20 | waste gate valve |
| 21 | stem |
| 21a | one end (first end) |
| 21b | other end (second end) |
| 24 | support hole (through-hole) |
| 25 | bushing (bearing) |
| 28 | link member |
| 31, 31B, 31C | other end of bushing |
| 32, 32B, 32C | spring mechanism |
| 33 | inclined surface (inclined surface of bearing) |
| 35, 35B | flange portion |
| 36, 41 | protrusion piece |
| 37 | opening |
| 38 | curved surface (contact surface of spring mechanism) |
| 39 | recessed portion (accommodation recessed portion) |
| 42 | inclined surface of protrusion piece (contact surface of spring mechanism) |
| 43 | curved surface (inclined surface of bearing) |
| 45 | inclined surface (inclined surface of bearing) |
| 47 | protrusion portion |
| 49 | inclined surface (contact surface of spring mechanism) |

The invention claimed is:

1. A variable flow rate valve mechanism which opens and closes an opening of a variable gas flow rate passage, the variable flow rate valve mechanism comprising:
a valve body which opens and closes the opening;
a stem which is rotatably supported by a housing while the valve body is connected to a first end thereof;
a cylindrical bearing which is inserted through a through-hole of the housing and rotatably supports the stem about an axis line of the stem;
a link member which is connected to a second end of the stem; and
a spring mechanism which is disposed in a gap between the link member and an end of the bearing, on a second end side of the stem,
wherein the end of the bearing includes an inclined surface which contacts the spring mechanism and is inclined with respect to the axis line of the stem,
wherein the spring mechanism includes a flange portion which contacts the link member while protruding outward in the radial direction of the bearing at the second end side in an axial direction of the stem, and
wherein the link member is provided with an accommodation recessed portion accommodating the flange portion and restraining the outward movement of the flange portion in the radial direction.

2. The variable flow rate valve mechanism according to claim 1,
wherein the inclined surface is inclined to be widened outward in a radial direction of the bearing as it goes from a first end side toward the second end side in the axial direction of the stem at the inside in the radial direction of the bearing.

3. The variable flow rate valve mechanism according to claim 1,
wherein the spring mechanism is a dish-shaped spring,
the dish-shaped spring includes a protrusion portion which protrudes from the second end side toward a first end side of the stem in the axial direction of the bearing,
the protrusion portion is provided with an opening through which the stem passes, and
a curved surface is continuously formed in a circumferential direction of the stem to contact the inclined surface.

4. The variable flow rate valve mechanism according to claim 1,
wherein the inclined surface forms a line in a cross-section taken along an axis line of the bearing.

5. A turbocharger with the variable flow rate valve mechanism according to claim 1, the turbocharger comprising:
a turbine; and
a compressor which rotates by a rotational driving force generated by the turbine,
wherein the valve body opens and closes an opening of the variable gas flow rate passage bypassing the turbine.

* * * * *